(12) United States Patent
Klarner et al.

(10) Patent No.: US 6,654,186 B2
(45) Date of Patent: Nov. 25, 2003

(54) ARRANGEMENT FOR FIXING AN OPTICAL COMPONENT PART

(75) Inventors: Ullrich Klarner, Jena (DE); Nico Correns, Weimar (DE); Werner Hoyme, Jena (DE); Felix Kerstan, Jena (DE)

(73) Assignee: Carl Zeiss Jena GmbH, Jena (DE)

( * ) Notice: Subject to any disclaimer, the term of this patent is extended or adjusted under 35 U.S.C. 154(b) by 26 days.

(21) Appl. No.: 10/098,901

(22) Filed: Mar. 14, 2002

(65) Prior Publication Data

US 2002/0171956 A1 Nov. 21, 2002

(30) Foreign Application Priority Data

Mar. 16, 2001 (DE) .......................................... 101 12 714

(51) Int. Cl.[7] .............................. G02B 7/02; G02B 6/38; A47G 1/10
(52) U.S. Cl. ...................... 359/818; 359/813; 359/820; 359/822; 385/59; 385/60; 248/316.4; 248/664
(58) Field of Search ................................. 359/811, 813, 359/818, 819, 820, 822; 248/313, 316.4, 485, 642, 664; 385/59, 88, 60, 139

(56) References Cited

U.S. PATENT DOCUMENTS

| | | | | |
|---|---|---|---|---|
| 5,390,268 A | * | 2/1995 | Morlion et al. | 385/59 |
| 5,574,600 A | * | 11/1996 | Agro | 359/818 |
| 5,619,604 A | * | 4/1997 | Shiflett et al. | 385/59 |
| 6,163,417 A | * | 12/2000 | Nunnally | 359/822 |
| 6,181,490 B1 | * | 1/2001 | Wun et al. | 359/822 |
| 6,382,580 B1 | * | 5/2002 | Wisniewski | 248/316.4 |
| 6,382,842 B1 | * | 5/2002 | Arima et al. | 385/60 |

* cited by examiner

*Primary Examiner*—Loha Ben
(74) *Attorney, Agent, or Firm*—Reed Smith LLP

(57) ABSTRACT

An arrangement for fixing an optical component part in position in a device housing, comprising a holder which is connected to a housing and which presses the component part into a cutout in the housing accompanied by pretensioning. The holder is fashioned in one piece from elastic material and is provided with clamps that are formed integral with it, at least one of which clamps presses the component part against a reference plane in direction of one of the coordinates X, Y, Z accompanied by pretensioning, and fastening elements are formed integral with the holder for securing it to the housing.

9 Claims, 5 Drawing Sheets

View A - A from Fig. 1

ARRANGEMENT FOR FIXING AN OPTICAL COMPONENT PART

CROSS-REFERENCE TO RELATED APPLICATIONS

This application claims priority of German Application No. 101 12 714.6, filed Mar. 16, 2001, the complete disclosure of which is hereby incorporated by reference.

BACKGROUND OF THE INVENTION a) Field of the Invention

The invention is directed to an arrangement for fixing an optical component part in position in a device housing, comprising a holder which is connected to the housing and which presses the component part into a cutout in the housing accompanied by pretensioning.

b) Description of the Related Art

There are many known variant solutions for fixing optical component parts in position in mechanical mounts or receptacles or housings of optical devices, most of which hold the component parts in a defined position at defined reference surfaces using specially composed adhesive substances.

This requires more or less complicated devices with which the component parts are initially aligned in their installation position. Fixing is carried out subsequently by applying the adhesive to the intended connection points between the component part and the receptacle or housing by means of additional devices.

Apart from the relatively high expenditure on devices, a common disadvantage consists in that the curing process for the adhesive substances entails waiting periods inherent to the technique which are undesirable in economic respects. Further, specially developed adhesives are required to prevent mechanical stresses, particularly in arrangements that are subject to high thermal and mechanical loading.

Accordingly, the composition of the adhesive substances that are used must be adapted to the coefficient of expansion of the material of the optical component part and of the housing. Full surface contact between the optical component part and reference surface of the housing is virtually impossible, so that the mechanical load capacity of arrangements of this type, such as those required, for example, for connecting a small plasma grating to an Invar substrate, is limited.

Further, fastenings are known, particularly for plate-shaped or right-parallelepiped optical component parts in a housing, in which the component part is fixed in position in the housing by mechanical elements such as adjusting and setting screws.

However, arrangements of the kind mentioned above have the disadvantage that the outer contours of the component parts must be adapted to the mechanical fasteners as, for example, when fixing mirrors or gratings in position so as to prevent rotation, which is also costly.

OBJECT AND SUMMARY OF THE INVENTION

Proceeding from the disadvantages of the prior art described above, it is the primary object of the invention to further develop an arrangement of the type mentioned in the beginning in such a way that fixing in position in achieved virtually without stresses even under thermal and mechanical loading while reducing technical expenditure.

According to the invention, this object is met in that the holder is fashioned in one piece from elastic material and is provided with clamps that are formed integral with it, at least one of which clamps presses the component part against a reference plane in direction of one of the coordinates X, Y, Z accompanied by pretensioning, and fastening elements are formed integral with the holder for securing it to the housing.

After the holder has been mounted in a very simple manner, which can be achieved in one movement, the optical component part is held in a defined manner in the X-, Y- and Z-direction under elastic pretensioning by the clamps which are formed integral with the holder. Different changes in length in the housing, optical component part and holder caused by thermal loading are compensated elastically. This also applies in analogous manner to mechanical loading caused by acceleration, shocks or blows.

The holder is advantageously produced from a spring metal sheet from which the clamps are punched out and angled depending on the coordinate direction X, Y, Z.

In a preferred construction, the holder is additionally outfitted with guide webs and the housing is outfitted with grooves, or vice versa, these webs and grooves engaging one inside the other in a positive engagement by which the holder is fastened to the housing.

The guide webs are formed, for example, by two portions which are angled and which accordingly project from the spring metal sheet in a claw-shaped manner and engage in correspondingly shaped counter-contours, i.e., grooves, in the housing. This enables, for one, a displacement of the holder relative to the housing as in a straight-line guide.

When mounting, the optical component part is initially inserted into the cutout and pushed against the reference surfaces facing in X-, Y- and Z-direction. The spring metal sheet is then fitted by inserting the guide webs into the grooves and displacing the spring metal sheet until the optical component part contacts the reference surfaces accompanied by pretensioning.

The holder is preferably constructed in such a way that two clamps are provided which press the optical component part against a reference plane oriented vertical to the Z-direction accompanied by pretensioning and two additional clamps are provided, one of which presses the optical component part against a reference plane oriented vertical to the X-direction and a reference plane oriented vertical to the Y-direction.

The holder is secured against displacement along the grooves in precisely that position in which the optical component part occupies its defined position.

Further, a substantial advantage compared to adhesive techniques consists in that it is possible to exchange the optical component part easily without the risk of damaging the holder or the housing.

The reference plane oriented vertical to the Z-direction is advantageously constructed as a three-point support. In contrast, the two reference planes oriented vertical to the X-direction and Y-direction can be constructed as contact surfaces or can be defined by contact points.

In order to maintain the frictional engagement between the optical component part and the reference surfaces on the housing when acted upon by acceleration forces and changes in length in X-, Y- and Z-directions, the pretensioning generated by the provided clamping elements, locking elements and guide elements is advisably so dimensioned, depending upon the load to be expected in special applications, that a change in position of the component part relative to the housing is prevented. This can be achieved, for example, by adapting the shape and pretensioning of the clamps or through a choice of material which takes into account the modulus of elasticity and the permissible tensions of the material.

In order to prevent the entrance of light or the penetration of moisture and dust between the reference surfaces at the housing and the contact surfaces of the optical component part, the optical component part can be connected with the housing additionally via a sealing compound, for example, in the form of a bead.

A possible selection of material could be, for example, BK 7 for the optical component part, Dispal for the housing and high-grade spring steel sheet for the holder.

The invention will be explained more fully in the following with reference to an embodiment example.

DESCRIPTION OF THE PREFERRED EMBODIMENTS

Figure 1:
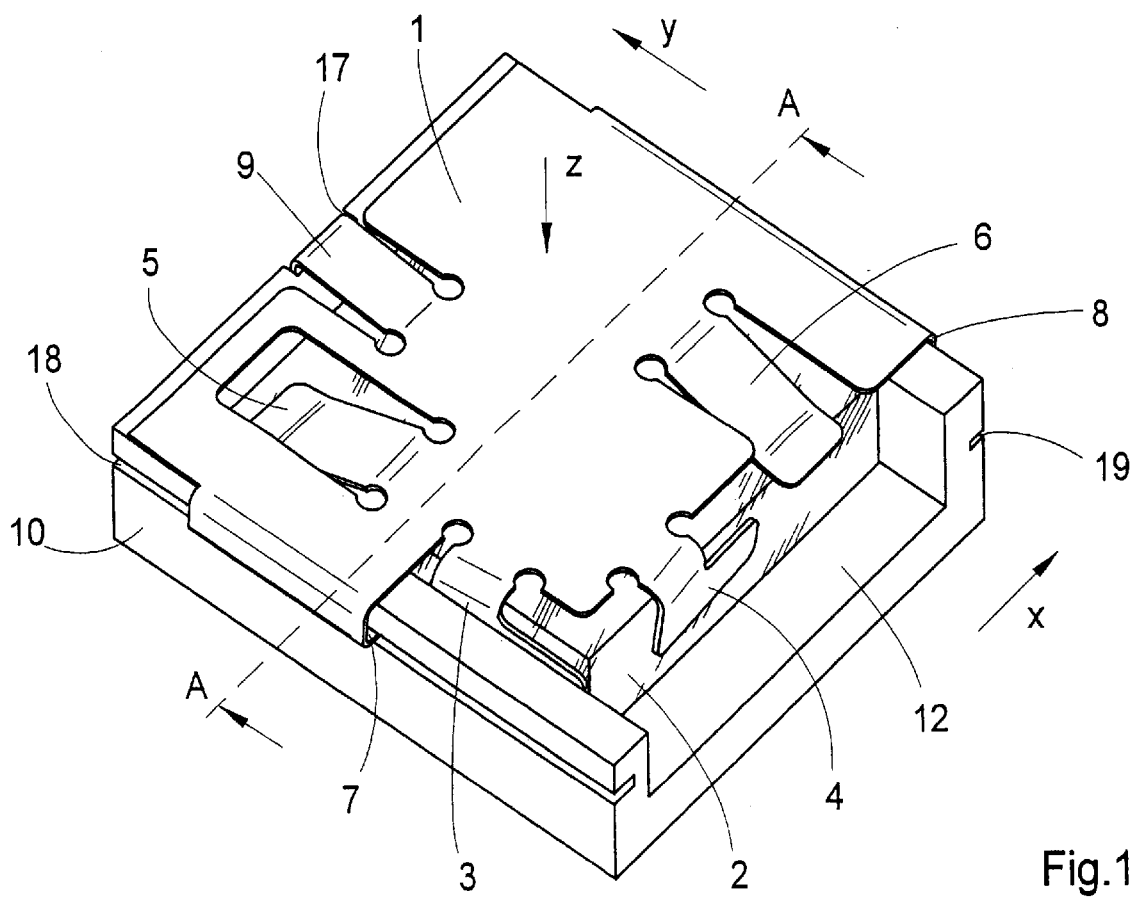
FIG. 1 shows the holder with inserted optical component part.

FIG. 1 shows a holder 1 which is made of spring metal sheet and in which a right parallelepiped-shaped optical component part 2 is inserted prior to assembly. The holder 1 is formed of a punched shaped part with a clamp 3 which generates a pretensioning in X-direction and a clamp 4 which generates pretensioning in Y-direction.

Further, the holder 1 has two clamps 5 and 6 producing pretensioning in Z-direction and two claw-shaped angles in the form of guide webs 7 and 8 which serve to fasten the component group comprising the optical component part 2 and holder 1 to a housing not shown in FIG. 1.

The holder 1 additionally comprises a locking element 9 whose function will be described in the following.

Figure 2:
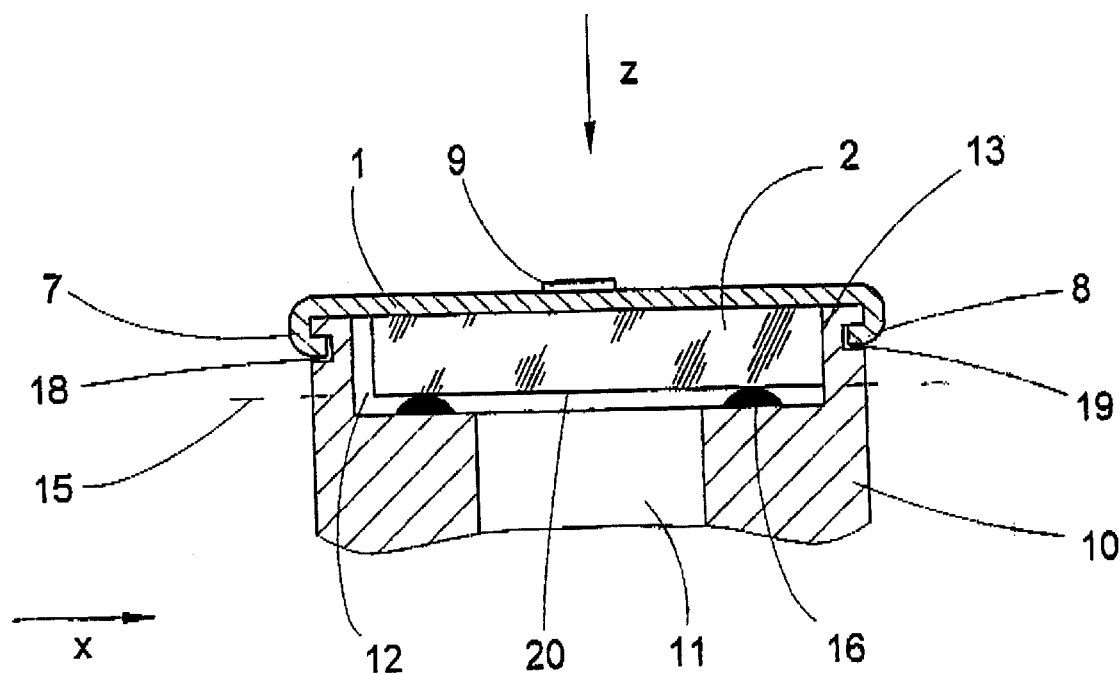
FIG. 2 shows the optical component part fixed in position in Z-direction (section AA from FIG. 1)
Figure 3:
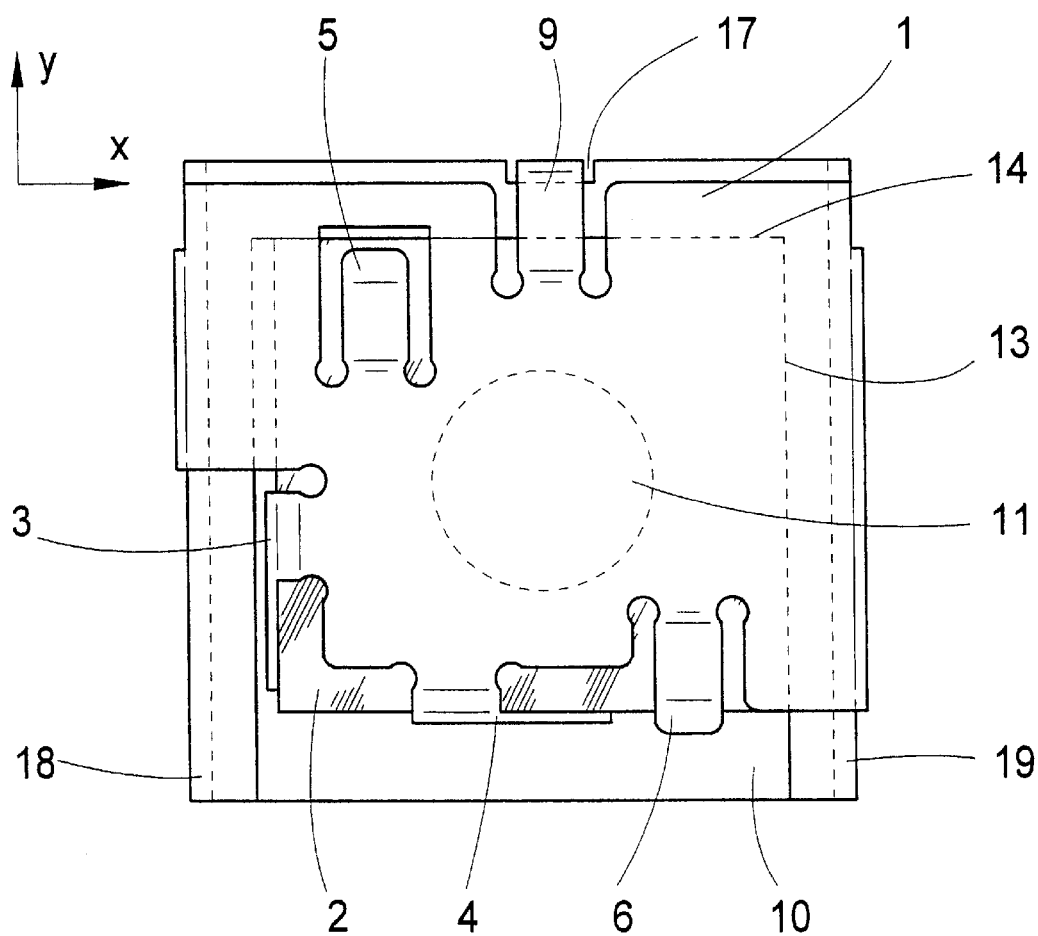
FIG. 3 shows the contact of the optical component part at the reference surfaces oriented vertical to X- and Y-directions.
Figure 4:
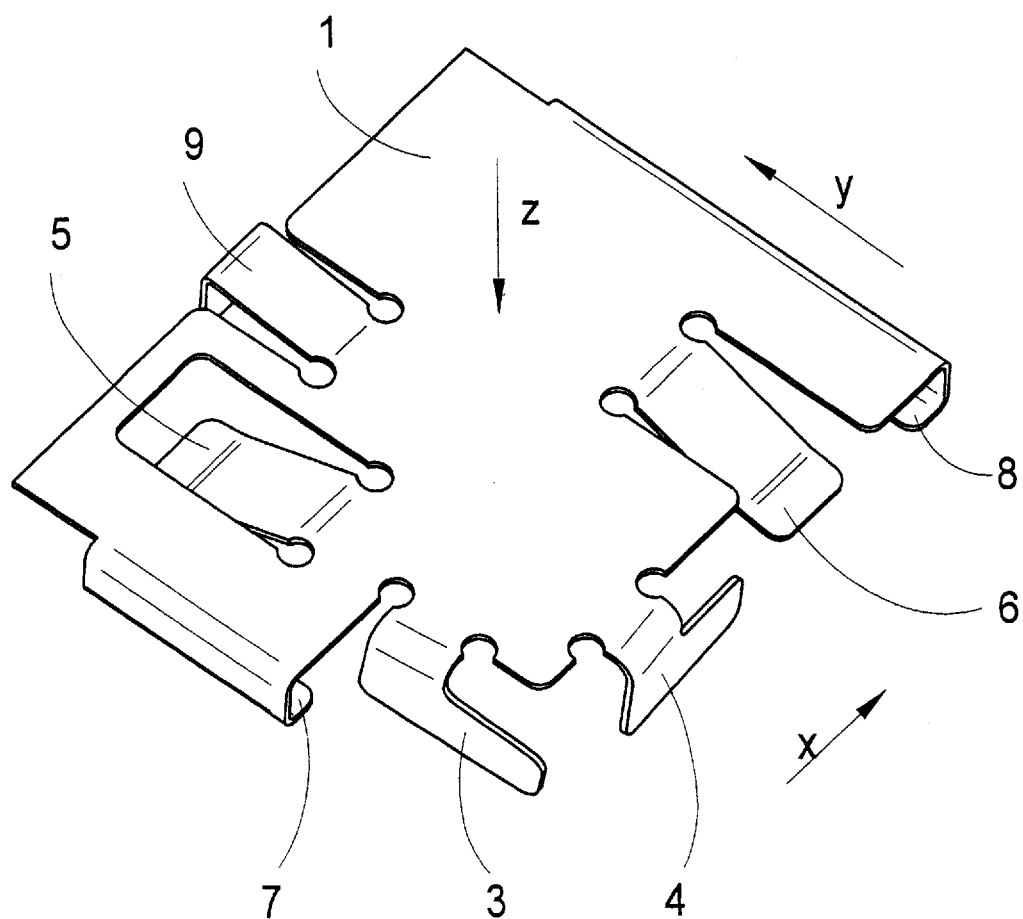
FIG. 4 shows the holder as an individual part from a first perspective.
Figure 5:
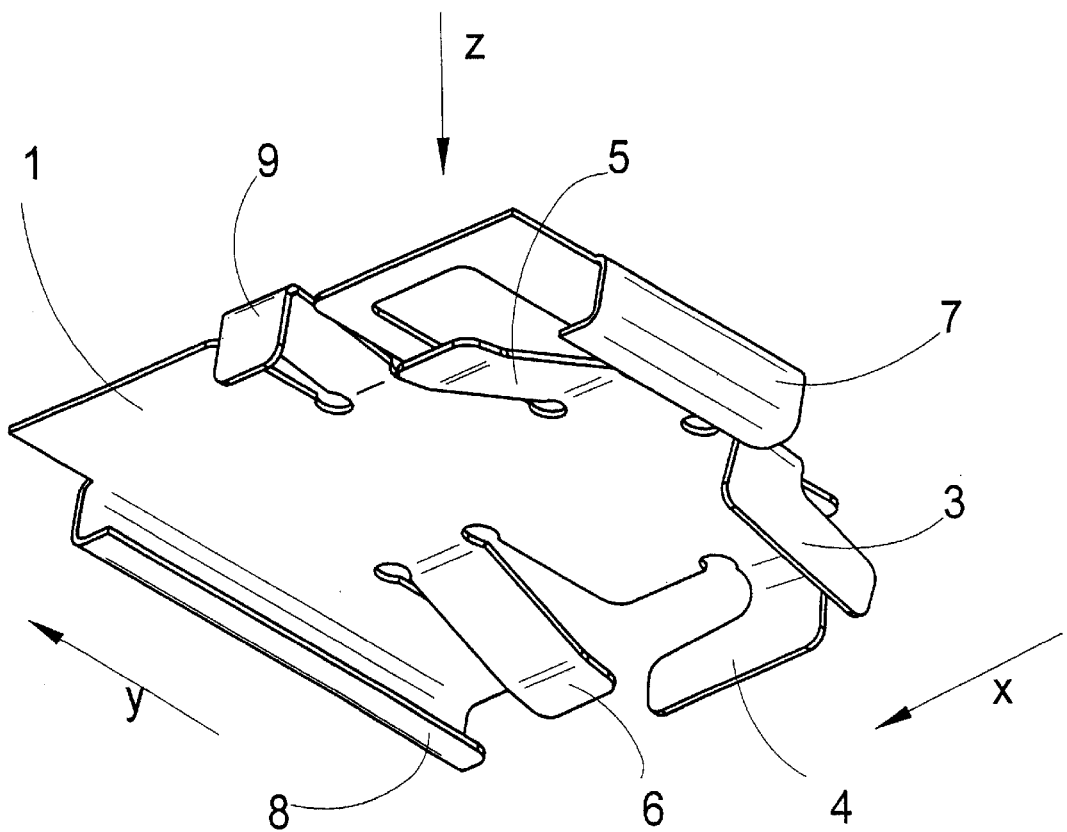
FIG. 5 shows the holder as an individual part from a second perspective.

FIG. 2 shows a section AA from FIG. 1. FIG. 3 shows the arrangement, according to the invention, in the assembled state.

The housing 10 which is provided with an opening 11 and a cutout 12 is also shown. The cutout 12 has a reference surface 13 serving for contact with the component part 2 in X-direction, a reference surface 14 (compare FIG. 3) serving for contact with the component part 2 in Y-direction, and a reference plane 15 serving for contact with the component part 2 in Z-direction.

The reference plane 15 is formed by three support points 16 resulting in a three-point support.

The optical component part 2 is fixed in position at the reference surfaces 13, 14 and the reference plane 15 by the clamps 3, 4, 5 and 6. The guide webs 7, 8 formed at the holder engage in the grooves 18, 19 at the housing 10. When the component part 2 is mounted, as is shown in FIG. 3, the locking element 9 engages in a contour 17 arranged in the housing 10 and accordingly prevents an unwanted displacement of the holder 1 with the component part 2 in Y-direction to which the guide webs 7, 8 and grooves 18, 19 are oriented in parallel manner.

When mounting, the component part 2 is initially inserted into the cutout 12, its optically active surface 20 facing in the direction of the opening 11. The guide webs 7, 8 of the holder 1 are then introduced into the grooves 18, 19 accompanied by elastic pretensioning, and the holder 1 is displaced in Y-direction until the component part 2 contacts the reference surface 14.

During this process, the locking element 9 is lifted by manual force until it slides over the edge of the reference surface 14 and, finally, when the component part 2 reaches the reference surface 14, locks into the contour 17 at the housing 10.

Fixing in position relative to the reference surfaces 13, 14 and 15 is carried out, that is, the component part 2 occupies the predetermined defined position, by the pretensioning of the clamps 3, 4, 5, 6,.

There is no change in position even under thermal loading because changes in length are compensated by the clamps 3, 4, 5 and 6 and locking element 9.

The mounting of the component part 2 can be carried out very quickly. There are no required waiting periods as when using adhesive substances, for example, and no technical auxiliary tools such as assembly tools are needed. When increased thermal and mechanical loads are anticipated, the holder 1 can be exchanged quickly and easily for another tool which is geometrically identical but which generates greater pretensioning.

While the foregoing description and drawings represent the present invention, it will be obvious to those skilled in the art that various changes may be made therein without departing from the true spirit and scope of the present invention.

| List of Reference Numbers | |
|---|---|
| 1 | holder |
| 2 | optical component part |
| 3 | clamp, X-direction |
| 4 | clamp, Y-direction |
| 5, 6 | clamp, Z-direction |
| 7, 8 | guide webs |
| 9 | locking element |
| 10 | housing |
| 11 | opening |
| 12 | cutout |
| 13 | reference surface, X-direction |
| 14 | reference surface, Y-direction |
| 15 | reference surface, Z-direction |
| 16 | support points |
| 17 | contour |
| 18, 19 | grooves |
| 20 | optically active surface |

What is claimed is:

1. An arrangement for fixing an optical component part in position in a device housing, comprising:
    a device housing;
    an optical component part for being fixed in position in said housing;
    a holder which is connected to said housing and which presses said optical component part into a cutout in said housing accompanied by pretensioning;
    said holder being fashioned in one piece from elastic material and being provided with clamps that are formed integral with it;

at least one of said clamps pressing said component part against a reference plane in the direction of one of the coordinates X, Y, Z accompanied by pretensioning; and fastening elements formed integral with said holder for securing it to said housing.

2. The arrangement according to claim 1, wherein the material for the holder is spring metal sheet.

3. The arrangement according to claim 1, wherein the holder is outfitted with guide webs and the housing is outfitted with grooves, or vice versa, these webs and grooves engaging one inside the other in a positive engagement by which the holder is fastened to the housing.

4. The arrangement according to claim 1, wherein two clamps are provided which press the optical component part against a reference plane oriented vertical to the Z-direction accompanied by pretensioning and two additional clamps are provided, one of which presses the optical component part against a reference plane oriented vertical to the X-direction and a reference plane oriented vertical to the Y-direction.

5. The arrangement according to claim 4, wherein the reference plane oriented vertical to the Z-direction is formed by three support points.

6. The arrangement according to claim 4, wherein the two reference planes oriented vertical to the X-direction and Y-direction are constructed as contact surfaces or are defined by contact points.

7. The arrangement according to claim 1, wherein at least one locking element is formed integral with the holder and fixes the holder in the displacement direction predetermined by the orientation of guide webs and grooves.

8. The arrangement according to claim 1, wherein the optical component part is additionally connected to the housing by a sealing compound.

9. The arrangement according to claim 1, wherein the optical component part is produced from BK 7, the housing is produced from Dispal, and the holder is produced from a high-grade spring steel sheet.

* * * * *